United States Patent Office 3,166,600
Patented Jan. 19, 1965

3,166,600
PROCESS FOR THE PREPARATION OF
SIMPLE KETALS
Nicholas B. Lorette and William L. Howard, Lake Jackson, Tex., assignors to The Dow Chemical Company, Midland, Mich., a corporation of Delaware
No Drawing. Filed Apr. 25, 1961, Ser. No. 105,260
6 Claims. (Cl. 260—611)

The present invention relates to a method for the preparation of ketone acetals and more particularly concerns a new and useful method for the preparation of compounds which can be characterized by the general formula

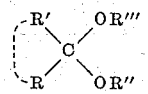

Wherein R″ and R‴ each represents an aliphatic or cycloaliphatic radical, the residues of primary or secondary alcohols, having from 2 to 6 or more carbon atoms, inclusive, and which radicals may contain halogen or oxygen in their structures; and wherein R and R′ represent aliphatic organic radicals having from 1 to 6 carbon atoms and where R and R′ may be joined together when the sum total of the carbon atoms in the aliphatic carbon chains is five or six, to form a cycloaliphatic ring or an aromatic radical and which radicals may contain halogen, oxygen, or lower alkyl radicals. Some of the compounds prepared by the method of the present invention and defined above are new compounds and have been found to be useful as herbicides.

It is an object of the present invention to provide a process for preparing both symmetrical and mixed ketals, those in which the alkoxy groups are, respectively, the same and different. Another object of this invention is to provide a method of making ketals from readily available materials. Many of the ketals which can now be prepared by the process of the present invention are of a higher order, i.e., are composed of alcohol and ketone moieties of more than three carbons. It is a further object to provide a process of making ketals in which essentially any primary or secondary alcohol and a ketone may be reacted to form the corresponding ketals in good yields. It is a still further object of this invention to provide a process in which the undesired products of the reaction are easily separated from the reaction mixture.

It has now been found that substantially any ketone can be converted to its corresponding ketal of substantially any monohydric primary or secondary alcohol by reacting the ketone with the alcohol in the presence of a lower dialkyl ketal of a lower ketone and an acid catalyst. The reaction proceeds readily at temperatures of from about 0° to about 150° C. A convenient manner of carrying out the process of the present invention is to remove the ketone and/or alcohol of the starting ketal, as they are formed, as an azeotrope with an inert organic solvent. Suitable organic solvents are hexane, cyclohexane, propyl bromide, 2-chloropropane, benzene, cyclopentane, methylcyclopentane, 2,3-dimethylbutane, isopropyl ether, and the like. Good yields of the desired product are obtained when the reactants are employed in about stoichiometric proportions and preferably when the ketal is employed in a slight molar excess over the ketone. If a symmetrical ketal is desired the molar ratio of alcohol to ketone should be at least 2 to 1 and can be as high as 10 to 1, but there is no advantage to increasing this ratio further. On the other hand, if a mixed ketal is wanted, at least a one to one molar ratio of alcohol to ketone should be used. As this ratio increases and approaches two to one, more of the symmetrical ketal is formed. An advantage of this process is that it is now possible to make ketals in which all of the alkyl, aryl or substituted alkyl and aryl groups contained therein may be different from the corresponding groups of the original ketal used as a reactant. This has a further advantage in that it can be accomplished in essentially a single step.

The mechanism of reaction while not entirely understood can be empirically represented according to the following reaction:

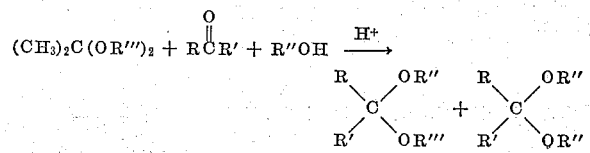

Substantially any primary or secondary alcohol can be employed in accordance with the present invention.

Thus, one can employ the primary or secondary alkanols, alkenols, chloroalkanols, alkoxyalkanols, cycloalkanols, cycloalkenols and the like. For example, one can employ methanol, ethanol, propanol, 2-propanol, butanol, 2-butanol, pentanol, 2-pentanol, 3-pentanol, 2-methylbutanol, 2-methyl-butan-3-ol, heptanols, octanols, decanols, cyclopentanol, cyclohexanol, 2,3-dimethylcyclohexanol, 2-cyclopentenol, 3-cyclohexenol, allyl alcohol, methallyl alcohol, 2-methy-3-butenol, 2-chloroethyl alcohol, 1-chloro-butan-3-ol, the 2-alkoxyalkanols, such as 2-methoxyethanol, ethoxypropanol and the like.

Various lower alkyl ketals of lower ketones can be employed in accordance with the present invention. However, it is apparent that acetone dimethyl acetal, the cheapest and easiest to prepare, is the preferred acetal. Others may be employed, but with no apparent advantage obtained. Thus, the methyl acetal of cyclohexanone; acetone methyl ethyl ketal; acetone diethyl ketal; acetone methyl isobutyl ketal; acetophenone dimethyl acetal and the like can be employed.

Substantially any ketone can be employed in accordance with the present invention. Thus, one can employ the aliphatic ketones, as for example, butanone, 2-pentanone, 3-pentanone, 3-methyl-2-butanone, 2-hexanone, and the like; the alkenones, as for example, butenone, 2-penten-4-one, the cycloaliphatic ketones, as for example, cyclohexanone, cyclopentanone, 3-cyclopentenone, 2-cyclohexenone, and the like, and the aromatic ketones, as for example, acetophenone, 1-phenyl-2-propanone, and the like.

The reaction proceeds with production of the desired product at temperatures between about 0° and 150° C. However, for most compounds it is desirable to employ a temperature within the range of from about 30° to 80° C. to obtain the azeotrope of the by-product and organic solvent. Pressure is not critical and ordinarily is atmospheric pressure. However, it is to be understood that super- or sub-atmospheric pressures can be employed without materially affecting the reaction.

Substantially any of the well known acid condensation catalysts can be employed to catalyze the reaction. Thus one can employ the organic sulfonic acids such as paratoluenesulfonic acid, the inorganic acids such as sulfuric, hydrochloric, boron trifluoride as well as sulfonic acid ion exchange resins and the like to name only a few.

The following examples illustrate the present invention but are not to be construed as limiting:

EXAMPLE I

To illustrate the effect of the presence of alcohol during the interchange the following example is directed.

A solution composed of 1 mol of acetophenone, 1.5 moles of acetone dimethyl acetal, 410 ml. of hexane and 0.2 g. of p-toluenesulfonic acid, but with no added alcohol, was distilled at atmospheric pressure. The automatic distillation head was operated so that a 10 percent take-off was maintained. The first 100 ml. of distillate contained by volume 28 percent isopropenyl methyl ether and 1.8 percent acetone.

A second experiment was carried out using the same column. In this experiment, 2 moles of methanol, 330 ml. of hexane, 1 mole of acetophenone, 1.5 moles of acetone dimethyl acetal and 0.2 g. of p-toluenesulfonic acid made up the reaction mixture. The first 100 ml. of distillate contained by volume 1 percent isopropenyl methyl ether and 20 percent acetone.

The amount of acetone present in the distillate is a measure of the extent of the ketone interchange taking place.

EXAMPLE II

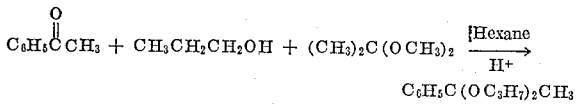

$$C_6H_5\overset{O}{\underset{\|}{C}}CH_3 + CH_3CH_2CH_2OH + (CH_3)_2C(OCH_3)_2 \xrightarrow[H^+]{\text{Hexane}}$$
$$C_6H_5C(OC_3H_7)_2CH_3$$

A solution composed of 1 mole of acetophenone, 8 moles of propanol, 1.5 moles of acetone dimethyl acetal, 300 ml. of hexane and 0.2 g. of p-toluenesulfonic acid was distilled at atmospheric pressure. The reflux ratio was such that the over-head temperature remained below 50° while 530 ml. of distillate was collected. (After each 150 to 250 ml. of distillate was collected, an equal amount of hexane was added to the distillation flask.) After 430 ml. of distillate had been collected, the overhead temperature slowly rose to 64° while an additional 240 ml. of distillate was collected. When a total of 770 ml. of hexane-acetone-methanol solution had been collected the resulting reaction solution was made basic with 0.2 g. NaOCH$_3$ dissolved in methanol and the distillation was continued, first at atmospheric pressure and then at reduced pressure as needed to keep the distillation flask temperature below 110°. A 63 percent yield of acetophenone di-n-propyl acetal was obtained; B.$_1$ 61°; $n_D^{25}$ 1.4750; $d_{25}$ 0.9366.

EXAMPLE III

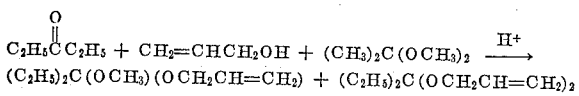

$$C_2H_5\overset{O}{\underset{\|}{C}}C_2H_5 + CH_2=CHCH_2OH + (CH_3)_2C(OCH_3)_2 \xrightarrow{H^+}$$
$$(C_2H_5)_2C(OCH_3)(OCH_2CH=CH_2) + (C_2H_5)_2C(OCH_2CH=CH_2)_2$$

A solution composed of 1 mole of 3-pentanone, 5 moles of allyl alcohol, 1.2 moles of acetone dimethyl acetal, 375 ml. of hexane, and 0.2 g. of p-toluenesulfonic acid was distilled at atmospheric pressure at a 5 to 10 percent overhead take-off rate. After each 150 to 250 ml. of distillate was collected, an equal volume of hexane was added to the distillation flask. After collecting 740 ml. of distillate, the reaction solution was made basic with NaOCH$_3$ dissolved in methanol. The distillation was continued, first at atmospheric pressure and then at reduced pressure as needed to keep the temperature of the distillation flask below 110°. A yield of 35 percent of 3-pentanone methyl allyl acetal was obtained; B.$_7$ 68°; $n_D^{25}$ 1.4343; $d_{25}$ 0.8767.

EXAMPLE IV

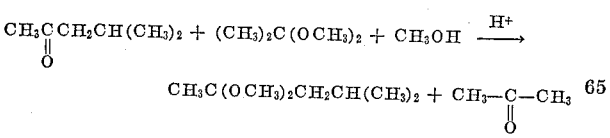

$$CH_3\overset{O}{\underset{\|}{C}}CH_2CH(CH_3)_2 + (CH_3)_2C(OCH_3)_2 + CH_3OH \xrightarrow{H^+}$$
$$CH_3C(OCH_3)_2CH_2CH(CH_3)_2 + CH_3-\overset{O}{\underset{\|}{C}}-CH_3$$

A solution composed of 4 moles of 4-methyl-2-pentanone, 6 moles of acetone dimethyl acetal, 15 moles of methanol and 0.2 g. of p-toluenesulfonic acid was distilled at atmospheric pressure. After the first 235 ml. was distilled at 6 percent take-off rate, an additional 235 ml. of methanol was added to the reaction solution. After the next 295 ml. was collected, 200 ml. of methanol was added. A third fraction of 285 ml. was collected and the solution was then made basic with NaOCH$_3$. The distillation was continued at atmospheric pressure until the flask temperature reached 100°. The pressure was reduced to 35 mm. where 1.3 moles of 4-methyl-2-pentanone (B.$_{35}$ 36°) was recovered, followed by 1.34 moles (50 percent yield) of 4-methyl-2-pentanone dimethyl acetal; B.$_{35}$ 58°; $d_{26}$ 0.850; $n_D^{25}$ 1.4042.

*Analysis.*—Calcd. for $C_8H_{16}O_2$: C, 65.71; H, 12.41. Found: C, 66.03, 66.12; H, 12.46; 12.24.

EXAMPLE V

A flask was charged with 700 ml. (6.7 moles) of cyclohexanone, 823 ml. (6.7 moles) of acetone dimethyl acetal, 276 ml. (6.7 moles) of methanol, and about 0.1 g. of p-toluenesulfonic acid, and the mixture was kept at 50° C. for one hour. After cooling to room temperature excess sodium methylate (0.1 g.) was added to inactivate the catalyst and the solution was distilled. There were obtained the following fractions:

| Fraction | B.P.,° C./ P. (mm.) | Volume, ml. | |
|---|---|---|---|
| A | 43–52/476 | 588 | Acetone, methanol, acetone dimethyl acetal, etc. |
| B | 37–39/263 | 168 | Methanol, acetone dimethyl acetal. |
| C | 47–56/14 | 183 | Cyclohexanone, cyclohexanone dimethyl acetal. |
| D | 57/14 | 720 | Cyclohexanone dimethyl acetal. |
| Residue and Trap | | 114 | Acetals, methanol, etc. |

The theoretical yield of cyclohexanone dimethyl acetal is 1020 ml. The actual yield of pure material, Fraction D, $n_D^{25.5}$ 1.4370, was 70 percent.

EXAMPLE VI

A solution composed of 98 g. of cyclohexanone (1.0 mole), 125 g. of acetone dimethyl acetal (1.2 moles), 264 g. of isopropyl alcohol (4.4 moles), 250 ml. of benzene and approximately 0.05 g. of p-toluenesulfonic acid was distilled at 267 mm. Hg pressure at 20 percent take-off rate for about 8 hours and then at 2 percent take-off for about 16 hours, the pot temperature remaining below 75° C. During this time about 226 ml. of distillate came overhead which was shown to be 52 percent benzene by volume. Substantially all the remainder was methanol with a small amount of water and acetone accounting for the excess over the theoretical amount of alcohol. Sodium dissolved in isopropyl alcohol was added to the pot residue after cooling to room temperature to neutralize the catalyst, and the product was fractionally distilled at reduced pressure to yield the following compounds: 99 g. of cyclohexanone methyl isopropyl acetal, or 57.5 percent theoretical; 34 g. of cyclohexanone di-isopropyl acetal, or 17 percent theoretical; the remaining approximately 25 percent was mostly acetone di-isopropyl acetal and cyclohexanone dimethyl acetal plus about 2 percent of cyclohexenyl isopropyl ether. Identification of the products was made by infra-red analysis of the distilled fractions.

EXAMPLE VII

In an identical experiment excepting that hexane was used as a solvent in place of benzene, the yields were cyclohexanone methyl isopropyl acetal, 40 percent; cyclohexanone di-isopropyl acetal 20 percent.

EXAMPLE VIII

One gram-mole of cyclohexanone, 1.1 moles of acetone dimethyl acetal, 0.1 mole of methanol, 2.0 moles of cyclohexanol, 750 ml. of cyclohexane, and 0.25 g. of p-toluenesulfonic acid were distilled with a good fractionating column. Distillation was stopped when the temperature in the head reached 77°. The mixture in the distillation flask was cooled and made basic by addition of excess sodium methoxide dissolved in methanol. The distillate contained one mole of acetone, 1.9 moles of methanol, and cyclohexane. Distillation was then continued until the temperature in the head was 62° at 10 mm. Hg pressure. A small portion of the residue was distilled rapidly through a Vigreux column, and the part boiling in the range 150–160° at 3 mm. Hg pressure solidified and was used to seed the remainder of the distillation residue. Chilling and filtration followed by recrystallization from ethyl ether gave 0.3 mole of cyclohexanone dicyclohexyl acetal, M.P. 42–44°.

EXAMPLE IX

Mixtures containing a ketone, acetone dimethyl acetal and a secondary alcohol were prepared to show the operability of secondary alcohols in the transketalization reaction. The mixtures shown in Table 1 were acidified with small amounts of acid catalysts. An infrared spectrum of each mixture was taken before and after the addition of the acid.

The spectrum of each mixture after the addition of the catalyst differed markedly from that of the same mixture before acidification. The distinguishing features of the mixtures containing the acid were the disappearance or diminution of absorption bands characteristic of the acetone dimethyl acetal and of the reactant ketone and alcohol compounds, and the simultaneous appearance of absorption bands due to the product ketals and methyl alcohol. The spectrum of a given mixture after the addition of acid was the same regardless of the acid used. The reactants, their molar proportions, the catalysts used, and the product ketals obtained are given in Table 1. The catalysts were used in amounts of from about 100 to 500 parts per million by weight of reaction mixture.

regardless of the acid used as catalyst. The spectrum of any given reaction mixture before acidification was quite different from the same mixture after the acid had been added. The distinguishing features of the mixtures containing the acid were the disappearance or diminution of absorption bands characteristic of the acetone dimethyl acetal and of the ketone and alcohol compounds and the appearance of absorption bands due to the product ketals and alcohols. Table 2 indicates the reactants used, their molar proportions, catalysts used and product ketals obtained. Acid catalysts were used in amounts of approximately 100 to 500 parts per million by weight of reaction mixture.

Table 2

| | Reactants | Molar Prop. | Catalyst | Product |
|---|---|---|---|---|
| A | Acetone dimethyl acetal<br>Acetophenone<br>n-Propyl alcohol | (1.2)<br>(1.0)<br>(2.0) | p-TSA [1] | Acetophenone di-n-propyl, Acetophenone n-propyl methyl, Acetophenone dimethyl, Acetone di-n-propyl, Acetone n-propyl methyl acetals. |
| | Same<br>Same | Same<br>Same | HCl<br>H$_2$SO$_4$ | Same.<br>Same. |
| B | Acetone dimethyl acetal<br>3-Pentanone<br>Allyl alcohol | (1.0)<br>(1.2)<br>(2.2) | p-TSA [1] | 3-Pentanone diallyl, 3-Pentanone allyl methyl, 3-Pentanone dimethyl, Acetone diallyl, acetone allyl methyl acetals. |
| | Same | Same | BF$_3$ | Same. |

[1] para-Toluenesulfonic acid.

The present application is a continuation-in-part of our copending application filed March 2, 1959, entitled "Process for the Preparation of Simple Ketals," Serial No. 799,399, now abandoned.

We claim:

1. In the method for preparing ketals which comprises reacting in the presence of an acid catalyst and at a temperature of from about 0° to about 150° C. a ketone having the formula:

wherein R and R' each represent a member independently selected from the group consisting of the phenyl radical and alkyl radicals having from 1 to 6 carbon atoms, and wherein R and R' can be joined together to form with the carbon atom of attachment a cycloaliphatic 5 to 6

Table 1

| | Reactants | Molar Prop. | Catalyst | Product |
|---|---|---|---|---|
| A | Acetone dimethyl acetal<br>Cyclohexanone<br>Sec.butyl alcohol | (1.0)<br>(1.06)<br>(1.4) | HCl | Cyclohexanone di-sec-butyl, cyclohexanone sec-butyl methyl, cyclohexanonedimethyl, acetone di-sec-butyl, and acetone sec-butyl methyl acetals. |
| | Same | Same | H$_2$SO$_4$ | Same. |
| B | Acetone dimethyl acetal<br>Cyclohexanone<br>Cyclohexanol | (1.0)<br>(1.06)<br>(1.04) | HCl | Cyclohexanone dicyclohexyl, cyclohexnone cyclohexyl methyl, cyclohexanone dimethyl, acetone dicyclohexyl, and acetone cyclohexyl methyl acetals. |
| | Same | Same | H$_2$SO$_4$ | Same. |
| C | Acetone dimethyl acetal<br>3-pentanone<br>Isopropyl alcohol | (1.0)<br>(1.06)<br>(1.4) | HCl | 3-pentanone diisopropyl, 3-pentanone-isopropyl methyl, 3-pentanone dimethyl, and acetone isopropyl methyl acetals. |
| | Same | Same | H$_2$SO$_4$ | Same. |

EXAMPLE X

The same reactions as in Examples II and III using the same and different acid catalysts were repeated. Infrared spectra were taken of the reaction mixtures before and after the addition of the acid. The spectra of the known reaction mixtures, the products of which had been isolated in the previous examples, were identical with spectra of the same mixtures of reactants membered ring, and an alcohol having the formula

R"OH wherein R" represents a member selected from the group consisting of the residue of primary and secondary aliphatic and cycloaliphatic alcohols having from 2 to 10 carbon atoms, the improvement of carrying out the reaction in the presence of about a molar equivalent of acetone dimethyl acetal based on the ketone reactant; removing at least one of the products acetone and methanol as formed; and recovering at least one of the products

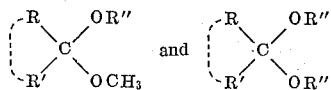

2. In the method of claim 1 the step of carrying out the reaction in the presence of an inert organic solvent which will form an azeotrope with at least one of the products acetone and methanol derived from the starting ketal.

3. The method of claim 1 wherein the reactants are employed in at least equimolecular proportions.

4. The method of claim 1 wherein the reaction is carried out at a temperature of from about 30° to about 80° C.

5. In the method of claim 2 the step of azeotropically removing the acetone derived from the starting ketal as formed.

6. In the method of claim 1 the step of carrying out the reaction in the presence of an inert organic solvent which will form an azeotrope with the methanol derived from the starting ketal.

No references cited.